Jan. 27, 1953

H. ABRAMS 2,626,663

KEY CUTTING MACHINE

Filed Dec. 22, 1949

INVENTOR
HOWARD ABRAMS
BY
Jerome R. Cox
ATTORNEY

Jan. 27, 1953  H. ABRAMS  2,626,663
KEY CUTTING MACHINE
Filed Dec. 22, 1949  3 Sheets-Sheet 2

INVENTOR
HOWARD ABRAMS
BY
Jerome R. Cox
ATTORNEY

Jan. 27, 1953  H. ABRAMS  2,626,663
KEY CUTTING MACHINE
Filed Dec. 22, 1949  3 Sheets-Sheet 3

INVENTOR
HOWARD ABRAMS
BY
Jerome R. Cox
ATTORNEY

Patented Jan. 27, 1953

2,626,663

UNITED STATES PATENT OFFICE 2,626,663

KEY CUTTING MACHINE

Howard Abrams, University Heights, Ohio, assignor to Curtis Industries, Inc., Cleveland, Ohio, a corporation of Ohio Application December 22, 1949, Serial No. 134,564

8 Claims. (Cl. 164—50)

The invention disclosed in this application relates to machines for cutting keys from blanks.

It is described in connection with two embodiments constructed according to my invention consisting of improvements on the key cutting machine shown in the patent to William H. Curtis, No. 1,995,798, patented March 26, 1935.

One of the objects of my invention is an improvement of the machine described in the above mentioned patent so that the feeding of the key into cutting position is automatically effected. The automatic feeding may be accomplished either (1) in one embodiment illustrating my invention, by movement of an operating lever controlling the position of a vertically slidable head which positions the key vertically or (2) in another modified embodiment illustrating my invention, by movement of the plunger which serves as the cutting die.

A further object of my invention is an improvement in the post which serves as a detent dial for the operating lever.

A further object is an improvement in the means for supporting, aligning, and positioning the key cutting plunger.

A further object is the provision of improved means for preventing rotation of the key cutting plunger and maintaining it in correct relationship.

A further object is the provision of an improved construction of the key blank carriage.

A further object is the provision of means for correcting the position of the head controlling lever to compensate for wear of the die.

Features of my invention include an improved bushing for the lever arm, an improved spring detent for holding the key carriage in proper position, and an improved spring clip attached to the key carriage for maintaining the key in proper relationship therewith during the feeding operation and during the cutting operation.

The above and other objects and features of my invention will become apparent from the following specification when considered in connection with the accompanying drawings which illustrate two embodiments of my invention.

Figure 1:
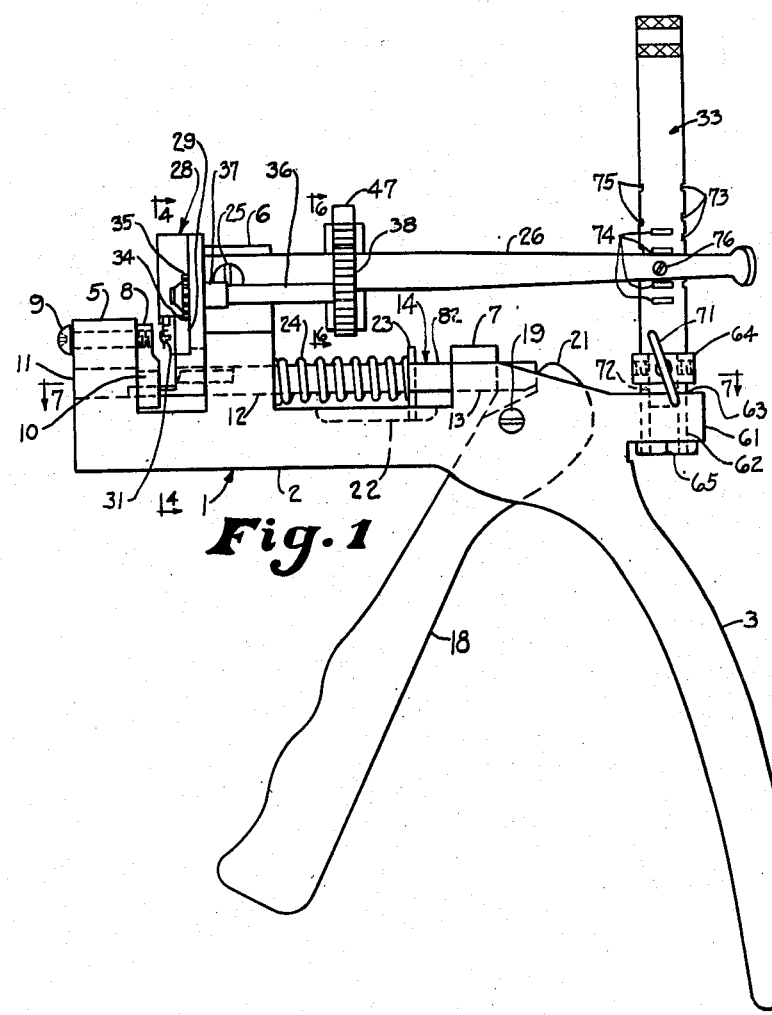
Fig. 1 is a view in side elevation of the preferred embodiment of the machine.
Figure 2:
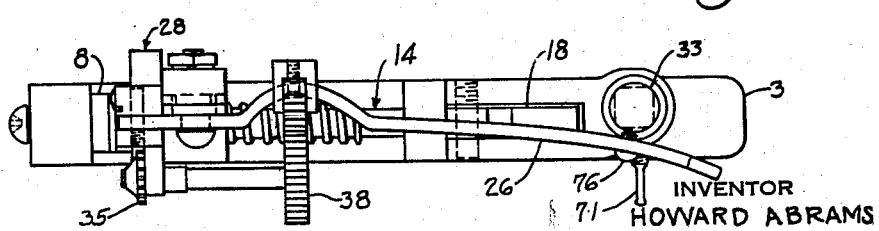
Fig. 2 is a view in top plan of the machine shown in Fig. 1.

Referring still to drawings for a detailed description of the invention, 1 indicates the main frame or body of the machine which is, as shown, provided with a bed portion 2 and with a handle portion 3 adjacent to the rear end. The handle portion 3 extends at an angle to the bed portion and generally conforms to the contour of the palm of a human hand. The bed portion 2 has several upright brackets formed thereon as are shown at 5, 6 and 7. The bracket 5 supports an anvil 8 which is the female die member, which is secured to the bracket 5 by means of a screw 9 and which is formed with an opening 10.

Figure 8:
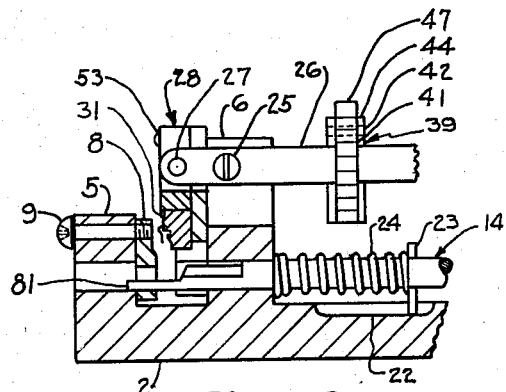
Fig. 8 is a fragmentary view in vertical section taken substantially on the line 8—8 of Fig. 3.
Figure 7:
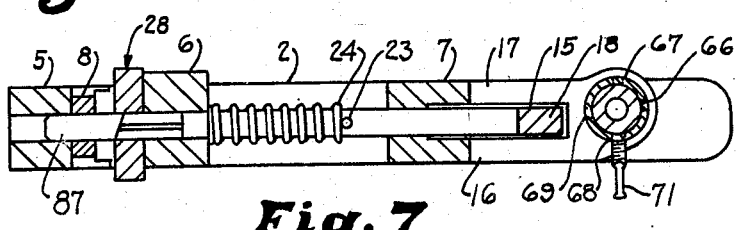
Fig. 7 is a view in horizontal section taken substantially on the line 7—7 of Fig. 1, the key cutting plunger however being shown in full lines.

The brackets 5, 6 and 7 are formed with cylindrical openings 11, 12 and 13 respectively which are aligned with each other. Supported by, and extending through these openings is a plunger 14 which may be satisfactorily and inexpensively formed of drill rod, is round and serves as the male blank cutting die. The shape of this plunger will be described more in detail later. As is shown more clearly in Fig. 7, the body member 2 is formed with a rectangular cut-out portion 15 on either side of which there are two side portions 16 and 17. Extending through the cut-out portion 15 is an operating lever 18 which is pivoted on a screw 19 (Fig. 1) extending through the side portions 16 and 17 and through the portion of the lever 18 which is positioned in the cut-out portion 15. The upper end 21 of the lever 18 is formed to contact with the rear end of the plunger 14 and is adapted to force the plunger 14 forward through the openings 13, 12 and 11. The rear end of the plunger 14 is bevelled to cooperate with the lever 18. The bed portion 2 intermediate the brackets 6 and 7 is formed with a slot 22 (Figs. 1 and 8). A pin 23 driven through a hole in the plunger 14 has its lower end extending into and is adapted to slide in the slot 22. By means of the pin 23 the plunger 14 is prevented from turning and is accurately positioned and retained in proper position for cutting the key blanks. Surrounding the rod 14 intermediate the brackets 6 and 7, I provide a spring 24. The spring 24 bears against the bracket 6 at its forward end and against the pin 23 at its rearward end. The spring 24 thus serves to return the plunger after the key cutting stroke.

Figure 3:
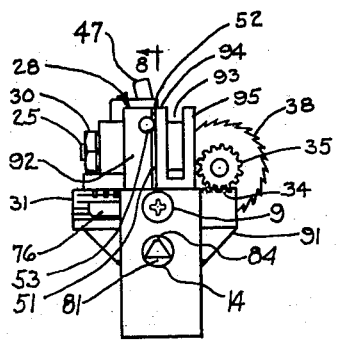
Fig. 3 is a view in front elevation of the machine shown in Fig. 1.
Figure 4:
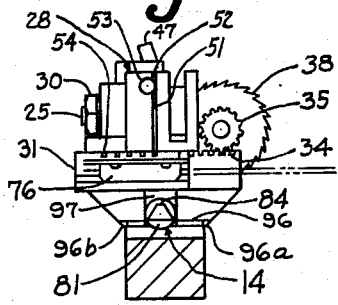
Fig. 4 is a view in section taken substantially on the line 4—4 of Fig. 1 and showing also a key blank aligned in such position that it may be inserted into the machine.

Means are provided for moving the key blank to and holding it in any selected position so that it may be accurately cut by cooperation of the cutting plunger or die 14 with the anvil 8. These means are arranged to lower or raise the blank to any desired height and to move it transversely to any desired position and to hold it there during the cutting operation. Through the upper portion of the bracket 6 (Fig. 1) there extends a bolt 25. On the bolt 25 is pivoted a positioning lever 26. The forward end of the lever 26 (as appears more clearly in Fig. 8) is connected through a screw 27 to a vertically slidable head 28 which will be described more in detail subsequently. As shown in Figs. 3 and 4 the bolt 25 is provided with a nut 30. In the head 28 there is provided a slot 29 (see Fig. 9). In the slot 29 there is shown a key carrying carriage 31. The carriage 31 may be of any one of several types in order to accommodate any selected type of key blank. For example, in Figs. 1, 3, 4, 8 and 9 there is shown the key carriage 31 which is adapted to hold a key blank such as the blank 32 shown in elevation in Fig. 4 and in section in Fig. 9.

In the operation of the machine, the lever 26 is rotated about the screw 25. Thereupon, the lever will, through its connection 27 with the head 28 raise or lower the head 28 and with it the key carriage 31 and the key 32 to position the key 32 at any desired point vertically for the operation thereon by the plunger 14. Adjacent the end of the longer arm of lever 26, a post 33 is provided for accurately positioning the lever 26 and holding said lever in any desired position so that the head 28 and the carriage 31 will maintain the key blank (e. g. 32) accurately in the desired vertical position.

Figure 6:
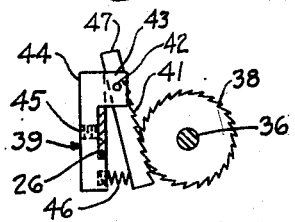
Fig. 6 is a fragmentary view in vertical section taken substantially on the line 6—6 of Fig. 1.

The means for moving the key blank transversely to any desired position and maintaining it in such desired position after it has been moved there will now be described. As heretofore stated the carriage 31 is arranged to carry a key blank (such as 32), the carriage 31 sliding transversely in the slot or groove 29 formed in the head 28. The upper side of each carriage 31 is formed with teeth 34 (see Figs. 3 and 4). Meshing with the teeth 34 is a gear wheel 35 by which the carriage 31 may be moved transversely. The gear wheel 35 is carried (see Fig. 1) on a shaft 36 which is journaled as at 37 in the vertically movable head 28. At the opposite end of the shaft 36 there is secured a ratchet wheel 38 which cooperates with a ratchet mechanism generally designated 39 (see Fig. 6). The ratchet comprises a rack 41 pivoted at 42 on a lug 43 of a bracket 44 secured by a screw 45 to the lever 26. A relatively light spring 46 maintains the rack 41 in contact with the ratchet wheel 38 so as to turn the wheel 38 on the downward stroke of the long end of the lever (the upward movement of the head 28) but is so light and the angle of the rack 41 is such that the ratchet is disengaged and there is no movement of the ratchet wheel 38 on the upward movement of the lever 26. An extension 47 on the upper end of rack 41 is provided so that the rack 41 may be disengaged from the ratchet wheel 38 when desired.

A spring detent is provided to hold the carriage in any selected desired position. The spring detent (best seen in Figs. 3 and 4) is designated 51 and is positioned in a groove 52 formed in the head 28. It is held therein by means of a rivet 53. The lower end of the spring detent 51 is adapted to extend into any one of a series of notches such as 54 suitably spaced so that when the detent 51 is in one of the notches the key carriage is accurately positioned for a specific cutting action of the plunger 14 on the key blank.

Referring to Fig. 1, I will now describe the detent dial post 33 and its mounting more thoroughly. The rear end of the body member 1 is formed with a rearwardly extending lug 61 formed with a threaded bore 62. A hollow bolt 63, provided with a head 64, and having external threads, is screwed into the threaded bore 62 and is accurately secured and fixed therein by means of a lock nut 65. The head 64 is formed with a plurality of horizontally extending threaded bores such as the bores 66, 67, 68 and 69 indicated in Fig. 7. A lock screw 71 is so fashioned that it can cooperate with any one of these bores. The post 33 is formed with a reduced lower end 72 as shown in dotted lines in Fig. 1. This lower end 72 extends into the hollow portion of the nut 63. The shoulder formed at the junction of the full upper portion of the post and the smaller diameter lower portion 72 thereof bears upon the top of the head 64. The rotative position of the post 33 is maintained (as may be desired) by means of the lock screw 71. The post 33 is substantially cylindrical and is formed on each of four sides with a series of straight milled slots such as the slots 73, the slots 74 and the slots 75. A screw 76 extending through the lever 26 is adapted to extend into any one of the slots on the post 33 and thus will accurately position the lever 26. Different key blanks have notches spaced according to different systems. I provide with each key cutting machine, a plurality of posts such as 33, each of which has a plurality of different series of slots spaced different distances so that by use of different posts and by using each of these posts for a plurality of series I am able to provide for all of a large number of different systems for the different key blanks.

As the cutting edge of the plunger 14 wears, adjustment should be made to compensate so that the depth of the cuts in the various blanks will be accurate. Accordingly, I provide means comprising the hollow bolt 63 and the lock nut 65 by which the height of the post may be varied a very small amount accurately to compensate for wear of the plunger. When the lock nut 65 is tightened on the thread of the hollow bolt 63, because of friction and the pressure on the threads caused by the tightening of the lock nut 65, the hollow bolt 63 may not be turned and therefore may not be raised or lowered accidentally. In order to raise or lower the hollow bolt 63 it is necessary to unscrew the lock nut and then adjust the hollow bolt 63 by turning it in the threads in the threaded bore 62 of the lug 61. After it has been adjusted to the proper position the lock nut 65 is again tightened so that the hollow bolt 63 is clamped and may not be inadvertently turned and thus moved up or down. The post 33 is held in position partly by the contact of the shoulder formed adjacent to the reduced lower end 72 and partly by the lock screw 71 which bears on the reduced lower portion 72 and prevents upward movement of the post 33 by reason of friction. The post 33 is prevented from going down in the hold in the hollow bolt 63 by contact of its shoulder with the top of the hollow bolt.

Figure 9:
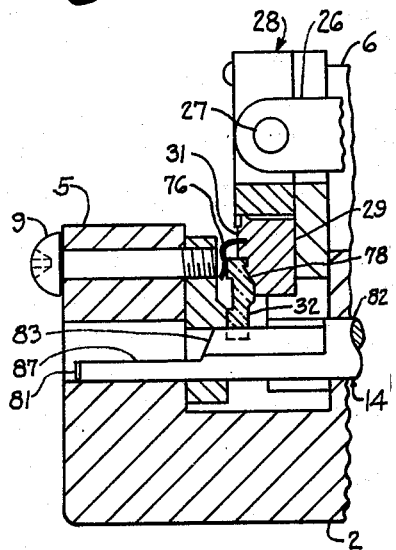
Fig. 9 is a fragmentary view in vertical section taken substantially on the line 8—8 of Fig. 3 but on a larger scale than the scale of Figs. 2 and 8, having additional portions omitted, and showing a key blank inserted in position for cutting.

I will now describe more in detail the key carriage 31. I provide with each key cutting machine a plurality of key carriages each one adapted for a different type of key blank. The key carriage 31 is illustrative of these various key carriages. All are similarly formed except that the contour varies in order to conform to the contour of one side of the key blank and the spacing of the notches 54 varies. Each of the carriages has a contour (ridges and grooves) adapted to conform to the shape of one side of the key blank for which such carriage is designed. Each also has positioning notches conforming to the spacing of the cuts which are to be made on the key blank. Each of such carriages (like the carriage 31) is provided with a spring clip such as 76 (see especially Figs. 3, 4 and 9) by means of which the key is held removably attached to the key carriage. For example, as shown in Fig. 9, the key carriage 31 is provided with ridge 78 which fits into a corresponding groove of the key blank 32. Each of the key carriages (like the key carriage 31) is provided with teeth like the teeth 34 with which the gear wheel 35 is arranged to mesh. In addition each of the key carriages is also provided with notches like the notches 54 with which the spring 51 engages. However, the spacing of the notches 51 varies with the different key carriages to conform with the distances between cuts which are to be made on the corresponding blanks.

Figure 10:
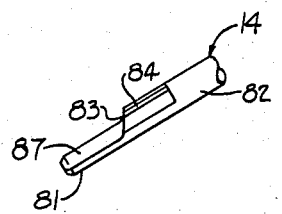
Fig. 10 is a fragmentary perspective view on an enlarged scale of a portion of the key cutting plunger showing the contour of the front end of said plunger.

I will now describe in detail the front or the cutting end of the plunger 14. As is shown most clearly in Figs. 9 and 10, the front end of the plunger is cut away so as to leave a segment 81 which has as its chord a line somewhat shorter than the diameter and as its arc the lower side of the plunger. This lower portion of the forward end rests upon the bottom of the opening 11 and thus guides the forward end of the plunger. Rearwardly as at 82 where the plunger passes through the round holes 12 and 13, it is cylindrical but intermediate the segment 81 and the cylindrical portion 82, the plunger is formed with a cutting surface 83. As is shown in Figs. 3, 4 and 10, this cutting surface is substantially triangular but has the point at the top cut off. Thus in operation the die forms a notch with a flat portion 86 such as is shown on the key 85 of Fig. 5. The front of the cutting edge is sloped upward and from right to left toward the rear as is indicated at 87 in Figs. 7 and 9. This shape of the die in effect forms a knife edge and aids in the efficiency of the cutting action.

Figure 11:
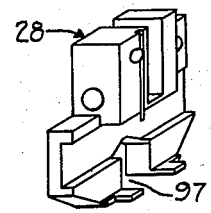
Fig. 11 is a perspective view of the vertically slidable head.

I will now describe the head 28 further. It comprises essentially a lower relatively wide guide portion 91 (in which there is formed the slot 29) and a relatively narrow upper portion 92. The upper portion is formed with a slot 93 and two side portions 94 and 95. The front end of the lever 26 extends into the slot 93 and the screw 27 extends through holes formed in the side portions 94 and 95. The groove 52 is formed in the side portion 94. The guide portion 91 has below the slot 29 a ridge 96. At the lower end thereof there are provided a pair of fingers 96a and 96b which bear against the anvil 8 and together with the screw 27 maintain the head in position for slidable vertical movement. The guide portion 91 is divided as at 97 so that the forward end of the plunger 14 may pass therethrough. As shown in Fig. 11, this division 97 is elongated vertically so as to permit the vertical movement of the head.

Figure 13:
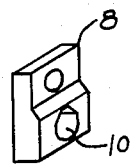
Fig. 13 is a perspective view of the anvil.

As shown in Fig. 13 the hole 10 in the anvil 8 has a contour conforming substantially to the cutting contour of the front or die portion of the plunger 14.

Figure 12:
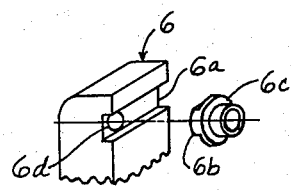
Fig. 12 is a perspective view of a portion of one of the brackets and of the improved bushing which is used therewith.

The bracket 6 (Fig. 12) is formed with a slot 6a in which there fits a rectangular extension 6b of bushing 6c. The hole 6d in the bracket 6 through which the bolt 25 extends is slightly oversize. Thus the bushing 6c and the bolt 25 may move horizontally backward or forward without varying vertically to compensate for the horizontal component of the arc of the movement of the screw 27.

Figure 5:
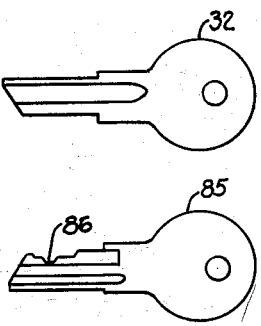
Fig. 5 is a view in side elevation of a key cut from the blank of Fig. 4 looking at the key as if turned over from the position of the blank shown in Fig. 4.

In the operation of my improved key cutting machine, a key blank is assembled with an appropriate key carriage. The lever 26 is raised to the appropriate slot on post 33. Then the rack 41 is withdrawn from contact with the ratchet wheel 38 by pressure on the extension 47 and the key carriage together with the key blank is inserted in the slot 29. The gear wheel 35 turns together with the shaft 36 and the ratchet wheel 38 while the latter is out of contact with the rack or ratchet 41. The carriage is inserted until the right hand edge thereof, as viewed in Figs. 3 and 4, is aligned with the right hand edge of the vertically slidable head 28. The key is thus positioned for the first cutting operation. The extension 47 is released and the first notch is cut in the blank by operation of the lever 18. The lever 26 is raised to the upper slot and then lowered to the lowermost slot. In so doing the rack 41 engages with the ratchet wheel 38 and rotates it so that the spring 51 enters into the second notch of the key carriage and the key is positioned horizontally for the next cutting operation. The lever 26 is then raised to the appropriate notch. This operation positions the key vertically by reason of the positioning of the head 28. Then the operating lever 18 is again pulled rearwardly toward the handle 3 forcing the plunger forward and causing the key cutting portion 83 thereof to cut an apropriate notch in the key blank 32. The lever 26 is then again raised to its uppermost position and again lowered to its lowermost position. The lever 26 is then raised to the appropriate notch 74 and the key is positioned horizontally and vertically for the next cutting operation. The operating lever 18 is again pulled rearwardly toward the handle 3 and a second notch is cut from the blank. This is continued until the key is fully cut as shown in Fig. 5. By way of illustration it may be pointed out that the key 85 was cut from the blank 32 in five operations of the operating lever 18. During the first operation the lever 26 was positioned so that the screw 76 was in the lowermost of the slots 74 with the result that no metal was removed from the key blank 32. In the second and third operations the screw 76 was positioned in the second slot 74 from the bottom so that only a small amount of metal was removed from the key blank. In the fourth operation the screw 76 was positioned in the third notch and a greater amount of metal was removed and in the fifth operation the screw 76 was positioned again in the second notch from the bottom so that an equal amount of metal was removed as in the second and third operations.

Figure 14:
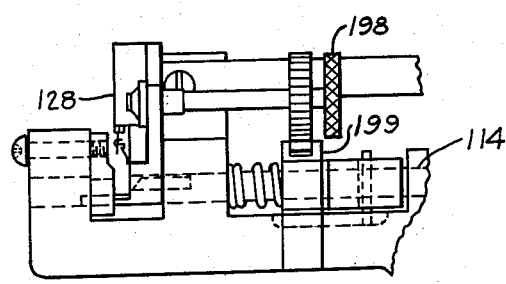
Fig. 14 is a fragmentary elevational view corresponding to the view of Fig. 1 but showing another form of my invention.

In the embodiment illustrated in Fig. 14, parts similar to the parts shown in Figs. 1 to 10 are designated by like numerals with the addition of 100. However, the rack 41 and the ratchet wheel 38 are omitted. Instead, the horizontal movement of the key carriage on the head 128 is accomplished either by manual operation of the knurled knob 193 or by the ratchet mechanism 199 which is actuated by the plunger 114.

It is to be understood that the above described embodiments of my invention are for the purpose of illustration only and various changes may be made therein without departing from the spirit and scope of the following claims.

I claim:

1. A key cutting machine comprising a frame; an anvil secured thereto; a die slidably mounted thereon and adapted to cut notches in key blanks; a head slidable vertically on the frame adjacent to the anvil; a carriage for supporting and guiding horizontally a key blank on the head in position to be cut; means to move the head slidably on the frame; means to move the die relative to the anvil to cut notches in the blank; and means energized by the operation of the means for moving the head slidably on the frame for moving said carriage to position the blank successively in positions for an entire series of cuts thereon.

2. A key cutting machine comprising a frame; an anvil secured thereto, a die slidably mounted thereon; a head slidable on the frame adjacent to the anvil; a support slidably mounted on the head for guiding a key blank into any one of a series of positions for forming the blank into a key; means, comprising a lever pivoted to the frame and connected at one end to the head for moving the head on the frame; means comprising a plunger for advancing the die toward the anvil to cut notches in the blank; and means rendered effective by said lever means for advancing said support to position the key blank successively in each of said series of positions.

3. A key cutting machine comprising a frame including a handle member; an anvil secured thereto; a plunger comprising a die slidably mounted thereon and adapted to cut notches in key blanks; a head slidable on the frame adjacent to the anvil; a carriage for supporting and guiding a key blank on the head in position to be cut; means to move the head slidably on the frame; means, comprising said plunger and a hand lever pivoted to the frame adjacent to the handle member and adapted to engage the plunger to operate it to move the die relative to the anvil to cut notches in the blank; and means energized by the operation of the means for moving the head slidably on the frame for moving said carriage to position the blank successively in positions for an entire series of cuts thereon.

4. A key cutting machine comprising a frame; an anvil secured thereto; a plunger having the forward end thereof formed as a die slidably mounted thereon; a head slidable on the frame adjacent to the anvil; a support slidably mounted on the head for guiding a key blank into any one of a series of positions for forming the blank into a key; means, comprising a lever pivoted to the frame and connected at one end to the head, for moving the head on the frame; means comprising a plunger for advancing the die toward the anvil to cut notches in the blank; and means rendered effective by said pivoted lever for advancing said support to position the key blank successively in each of said series of positions.

5. In a key blank cutting machine having a frame; an anvil secured to the frame, a cooperating die carried by the frame and movable relative thereto; a head slidably mounted on the frame; a carriage supported by the head and movable transversely of the direction of movement of the die and transversely of the direction of movement of the head; and a lever for shifting said head relative to said frame; the improvement which consists of a gear wheel for moving said carriage transversely of the direction of the movement of said head, and means carried by said lever for operating said gear wheel.

6. In a key blank cutting machine having a frame; an anvil secured to the frame; a cooperating die carried by the frame and movable relative thereto; a head slidably mounted on the frame; a carriage supported by the head and movable transversely of the direction of movement of the die and transversely of the direction of movement of the head; and a lever for shifting said head relative to said frame; the improvement which consists of a gear wheel for moving said carriage transversely of the direction of the movement of said head; and means comprising a rack carried by said lever, a ratchet wheel engaged by said rack; and a shaft, on which both said ratchet wheel and said gear wheel are mounted, carried by said head for operating said gear wheel.

7. A key cutting machine comprising a frame; an anvil secured thereto; a die slidably mounted thereon and adapted to cut notches in key blanks; a head slidable on the frame adjacent to the anvil; a carriage for supporting and guiding a key blank on the head in position to be cut; means to move the head slidably on the frame; means to move the die relative to the anvil to cut notches in the blank; and means energized by the operation of said head moving means for moving said carriage to position the blank successively in positions for an entire series of cuts thereon.

8. A key cutting machine comprising a frame having a slot and including a handle member; an anvil secured thereto; a plunger having a die formed as the forward end of the plunger, the plunger being slidably mounted on the frame and the die being adapted to cut notches in key blanks; a pair of brackets on the frame each formed with a hole for supporting and guiding said plunger; a spring interposed between said pair of brackets, surrounding an intermediate portion of said plunger so that said plunger extends through and out of said spring at each end, and bearing against one of said brackets at one end; and a pin extending through said plunger and positioned at all times in said slot in the frame and forming an abutment for the opposite end of said spring whereby said plunger is guided by said bracket, said plunger is prevented from rotating by the cooperation of said pin and slot, and said plunger is urged to its retracted position by the cooperation of said pin and spring.

HOWARD ABRAMS.

REFERENCES CITED

The following references are of record in the file of this patent:

UNITED STATES PATENTS

| Number | Name | Date |
|---|---|---|
| 1,081,472 | Tucker | Dec. 16, 1913 |
| 1,086,883 | Barrett | Feb. 10, 1914 |
| 1,458,217 | Best | June 12, 1923 |
| 1,615,020 | Loehr | Jan. 18, 1927 |
| 1,995,798 | Curtis | Mar. 26, 1935 |
| 2,058,719 | Pigman | Oct. 27, 1936 |
| 2,376,590 | Forss | May 22, 1945 |

FOREIGN PATENTS

| Number | Country | Date |
|---|---|---|
| 771,872 | France | Oct. 18, 1934 |